United States Patent [19]

Schafer et al.

[11] 4,329,561
[45] May 11, 1982

[54] METHOD OF ENSURING THE MAINTENANCE OF CONSTANT QUALITY OF SPOT WELDS

[75] Inventors: Rolf Schafer; Sumanjit Singh, both of Aachen, Fed. Rep. of Germany

[73] Assignee: Friedrich Eichhorn, Aachen, Fed. Rep. of Germany

[21] Appl. No.: 11,975

[22] Filed: Feb. 14, 1979

Related U.S. Application Data

[63] Continuation-in-part of Ser. No. 748,605, Dec. 8, 1976, abandoned.

[30] Foreign Application Priority Data

Dec. 11, 1975 [DE] Fed. Rep. of Germany ....... 2555792

[51] Int. Cl.³ ............................................. B23K 11/24
[52] U.S. Cl. .................................... 219/110; 219/108; 219/137 R
[58] Field of Search ........... 219/108, 109, 110, 137 R, 219/91.21, 114

[56] References Cited

U.S. PATENT DOCUMENTS

| | | | |
|---|---|---|---|
| 2,848,595 | 8/1958 | Van Sciver | 219/110 X |
| 3,417,221 | 12/1968 | Hayward | 219/110 X |
| 3,504,157 | 3/1970 | Vanderhelst | 219/110 |
| 3,538,293 | 11/1970 | Procacino | 219/91.21 X |
| 3,588,438 | 6/1971 | Vanderhelst | 219/110 |
| 3,662,146 | 5/1972 | Vanderhelst | 219/110 |
| 4,001,539 | 1/1977 | Franchi et al. | 219/110 |

FOREIGN PATENT DOCUMENTS

| | | | |
|---|---|---|---|
| 2137784 | 2/1972 | Fed. Rep. of Germany | 219/91.21 |
| 1321838 | 7/1973 | United Kingdom | 219/110 |

Primary Examiner—B. A. Reynolds
Assistant Examiner—M. H. Paschall
Attorney, Agent, or Firm—John C. Smith, Jr.

[57] ABSTRACT

A method of improving the reproducibility of the welds in an electric spot welding machine comprises prior to the initiation of a welding operation passing a preheating current of lower magnitude than the welding current through the parts to be welded. When either the total electrical workpiece resistance of the parts to be welded has fallen below a given limit or when its rate of decrease is slower than a predetermined limit the changeover from preheating current to welding current is effected.

8 Claims, 5 Drawing Figures

METHOD OF ENSURING THE MAINTENANCE OF CONSTANT QUALITY OF SPOT WELDS

This application is a continuation-in-part application of Ser. No. 748,605, filed Dec. 8, 1976 now abandoned.

BACKGROUND OF THE INVENTION

This invention relates to a method of ensuring the maintenance of constant quality of spot welds.

In spot welding a low voltage current of high amperage is passed between two electrodes through the lapped joint of two components that are to be welded, and a local weld is formed by the resultant generation of heat and the application of pressure. The total welding resistance is composed of the resistances of the materials forming the joint and of contact resistances in the path of the current. In the initial stage the contribution made by the contact resistances generally far outweighs that of the material of the components. However, as welding proceeds the contact resistances become rapidly lower. Their rate of decrease and the minimum they reach depend materially upon the condition of the surface of the welded components, upon the magnitude of the current, the pressure exerted by the electrodes as well as the electrode geometry. Furthermore, the change in resistance at the points of contact between electrode and metal will be affected by differences in specific pressure and in current density. If the state of the surface of the two components varies, the generation of heat in the weld nugget will also vary and the distribution of heat will be irregular although the settings of the welding machine remain unchanged. The result is the production of welds of irregular quality.

There is a particular demand for some method of automatically ensuring the production of constant quality welds for the spot welding of panels in the sheet metal industry. Various equipment is already known for improving the reproducibility of standard quality welds. Generally speaking, this can be classified under four different groups:

(a) Measuring instruments for measuring and indicating one or more of the parameters that are essential to the welding process, e.g. such as the r.m.s. value of the welding current.

(b) Control Instruments which assess the quality of a finished weld by measuring and comparing a prescribed quantity which is specific to the process with a reference value and which indicate the upward or downward deviation when this exceeds a prescribed limit of tolerance. The welding machine can be switched off if the deviation is abnormal.

(c) Quality Control Instruments which function in the same way as the instruments under (b), but which also trigger action for the readjustment of particular welding parameters before the next weld is made.

(d) Fully Automatic Closed Loop Control Systems which continuously conduct and correct the process by a continuous comparison between measured and reference quantities.

The instruments included in the above groups (c) and (d) are functionally based on one of the following principles of operation:

1.1 The maintenance of a constant voltage and/or current on the primary side of the welding transformer.

1.2 The maintenance of a constant voltage and/or current on the secondary side of the welding transformer.

1.3 A voltage integration over the welding time with time and current limitation.

1.4 A current integration over the welding time with time and current limitation.

1.5 Power integration as the product of the transient values of voltage and current during the welding time with current limitation (constant power system).

1.6 The control of welding time by reference to the thermal expansion or the rate of thermal expansion of the components at the weld nugget in a direction normal to the metal surface.

1.7 Control of welding time by reference to overall resistance.

However, none of these instruments is capable of ensuring the reproducibility of the welds under all conditions that may in practice arise.

For instance, instruments which measure electrical quantities cannot determine how much of the current is shunted through a neighboring weld that has already been completed or through a burr in the panel. Arrangements which rely on the displacement of the electrodes by thermal expansion of the components at the weld for purposes of control usually make no allowance for tolerances in the gauge of the sheet material and they can only partly compensate for electrode wear and fluctuations in other welding parameters.

In welding machines which are thus controlled extraneous interference with the welding process and gradual changes in the welding parameters in the course of a number of welds may also inadmissibly adversely affect the welding results, either in a random way in the case of a single weld, or gradually after a sequence of good spot welds have been made, although satisfactory results should have been expected from the preset reference parameters in a fully automatically controlled machine.

In the sheet metal processing industries faulty welds continue to occur although the starting conditions are correct; non-destructive testing often and at least sometimes completely fails to detect them. Manual spot checks—for instance with a chisel—are very unreliable and not satisfactory. Moreover, they require work to cease, when a given number of spot welds have been made, to enable an electrode or electrode cap to be replaced or remachined to exclude effects which are due to changes in the nature of the electrode contact face and the electrical contacting conditions, and which cannot be compensated by the above mentioned methods of control.

There is as yet no system which permits varying starting conditions, particularly respecting the initial electrical resistance, to be systematically controlled by the machine at the beginning of each welding operation.

SUMMARY OF THE INVENTION

It is therefore the object of the present invention so to control and conduct the welding process in a spot welding machine that spot welds of the same high quality will be invariably obtained.

To attain this object the present invention provides a method of improving the reproducibility of the welds in an electric spot welding machine, which comprises prior to the initiation of a welding operation passing a preheating current of lower magnitude than the welding current through the workpieces and switching over from preheating current to welding current when either the total electrical resistance of the weld zone has fallen below a given predetermined limit or when its rate of decrease becomes slower than a predetermined limit.

DESCRIPTION OF THE PREFERRED EMBODIMENT

According to the invention, a preheating current which is small in relation to the welding current is passed prior to the beginning of the actual welding process through the welding electrodes and the components that are to be joined by the weld (stage I). Preferably the contact pressure of the electrodes during this first stage is the same as that applied for forming the weld. The point in time for changing over from preheating to welding is for instance that when the total electrical resistance of the weld zone falls below a prescribed absolute value (limit I) previously determined as being best, or when the rate of decrease of the total resistance falls below a predetermined limit (limit II). By empirically ascertaining these limits in preliminary tests the starting conditions are very narrowly circumscribed and the further course of the heat generating process and hence the formation of the weld nuggets is precisely controlled. The conditions for the creation of welds of constant quality are thus present.

Figure 1:
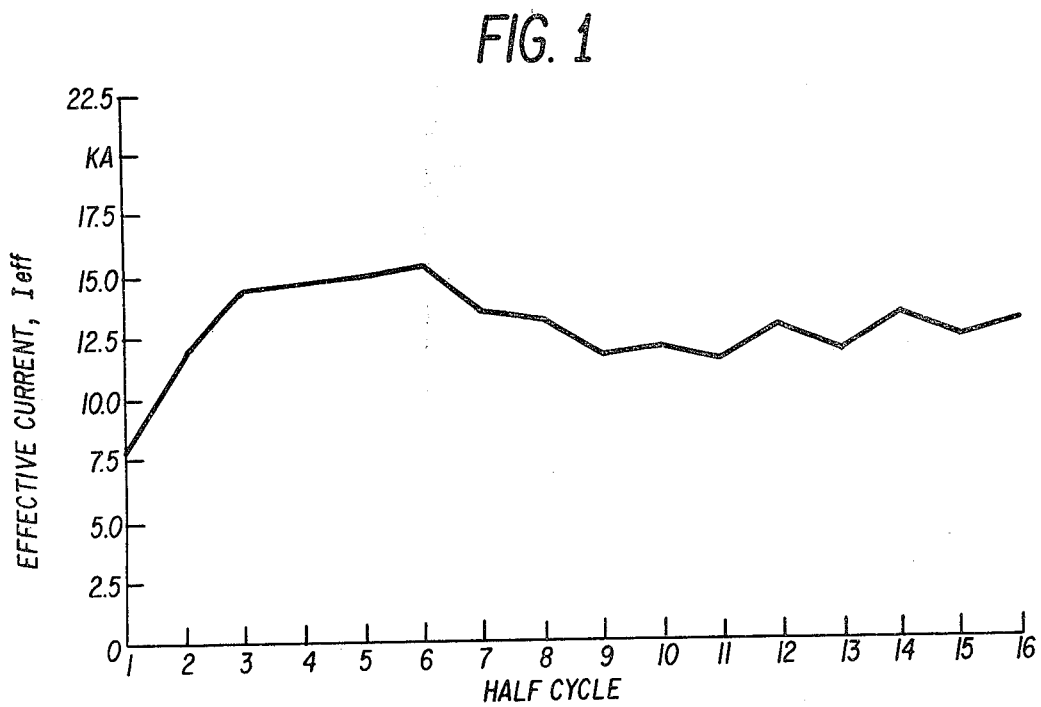
FIG. 1 is a typical curve showing the change in total electrical resistance as a function of time during the passage of a preheating current.

FIG. 1 shows the change in total electrical resistance of the workpiece $R_{ges}$ as a function of time t, during the passage of a preheating current which amounts to only about 20% to 50% of the full subsequent welding current. In the case of single-phase AC machines this total resistance is measured by dividing the voltage and current transients at the peak of each current half wave. When the total resistance falls below the prescribed limit the preheating stage is terminated and the machine switched over to current. It is similarly possible as a criterion for effecting the changeover to make use of the rate of decrease of the total resistance by reference to a limiting rate.

In both instances a maximum period for which the preheating current should flow ought also to be prescribed. Not later than at the end of this period should the changeover to welding current take place. If this period should in fact be reached or exceeded the presence of a fault outside the usual tolerances for surface changes, caused for instance by fouling or a change in the gauge of the components, may be inferred.

Numerous tests have confirmed that the employment of the present method leads to a substantial improvement in the average quality of serially produced spot welds, particularly when the sheet metal panels are dirty and their surfaces are corroded. The range of scatter of the values of the tensile strength of the spot welds is materially reduced.

A further reduction of the range of scatter and hence a further improvement in the qualitative uniformity of the welds is achieved by a further refinement in stage II. This consists in so controlling the welding period after the preheating in stage I has been completed that in the neighborhood of the weld thermal expansion will be the same for every weld. The measurement of electrode displacement is not begun until after the full welding current has been switched on. In conventional manner the movement of the electrodes due to thermal expansion of the components during the process of welding is measured within prescribed limits of time as being equivalent to a measurement of the size of the weld nugget, as well understood.

Furthermore, an upper limit may be laid down for the standard welding period. If this limit is reached repeatedly in succession or exceeded, the magnitude of the current may be raised by increasing the phase angle when making the following welds.

In the same way, for instance for the purpose of avoiding "spatter", a minimum welding period may be prescribed. If this is reached the magnitude of the current would be reduced for making the following welds. If the welding conditions should undergo a uniform change, the welding current will be automatically optimized in consecutive steps within the limits laid down for the standard welding time. Random unsystematic changes in the conditions of the process will have no effect.

Moreover, a maximum welding period will be prescribed if the required thermal expansion of the components as determined by the relative movement of the electrode is not attained. If this fails to be achieved despite repeated corrections of the current, and if the upper limit for the welding period is repeatedly exceeded, an indication is given that the service life of the electrodes has been reached and that an electrode change is therefore needed.

The electrode displacement to which the control should be adjusted in stage II should be determined for each job by reference to a trial weld, as is conventional, under ideal conditions (rated gauge of sheet material, no shunted current, perfect electrode geometry, clean component surfaces, no electrical or mechanical faults in the machine, and so forth).

If the electrode pressure deviates from the prescribed pressure the control system for stage II can be supplemented to correct the electrode displacement accordingly. Random shunting can be compensated by extending the welding time. For instance, if the mains voltage fluctuates, the control system will accordingly correct the current phase angle and hence the magnitude of the welding current.

In cases in which the principal variables affecting resistance spot welding are subject to major fluctuations from weld to weld (particularly with regard to welding voltage fluctuations, welding current fluctuations, electrode pressure, surface quality and gauge of the components) the proposed method can be further amplified by a stage III in which after preheating the welding current is regulated during welding. A desired electrode displacement is prescribed for the welding period and the welding current raised or reduced by a continuous comparison of this reference with the actual value. The required electrode displacement is measured empirically in preliminary tests under optimum welding conditions, as is well understood.

It is a precondition in stage II and stage III for the use of the electrode displacement as an equivalent to a measurement for determining the average temperature in the weld nugget that the contact pressure of the electrodes and the electrical mains voltage used for welding should remain within given tolerance limits. If it is found, prior to or during welding, that the contact pressure of the electrodes and/or the mains voltage deviate substantially from the prescribed value, then this may be taken to mean that the temperature distribution in the region of the weld nugget is being substantially changed. In such a case it is desirable to correct the originally prescribed reference for electrode displacement. The deviation of electrode displacement from the reference as a function of the mains voltage and electrode pressure can be empirically determined.

The function of stage III can be taken over and extended through the use of a computer. For instance, data relating to different materials and thicknesses of sheet materials and their relationship with the welding parameters that should be preset, and the required electrode geometries, can be fed into a store. The data may be permanently installed or they may be taken from cards or programs. The employment of a suitable welding computer permits all the problems that arise in the field of spot welding to be solved optimally.

In stage III and in its development as a computer the need for a change of electrodes is indicated when readjustment of the magnitude of the welding current within the preset limits fails to achieve the required electrode displacement.

Figure 3:
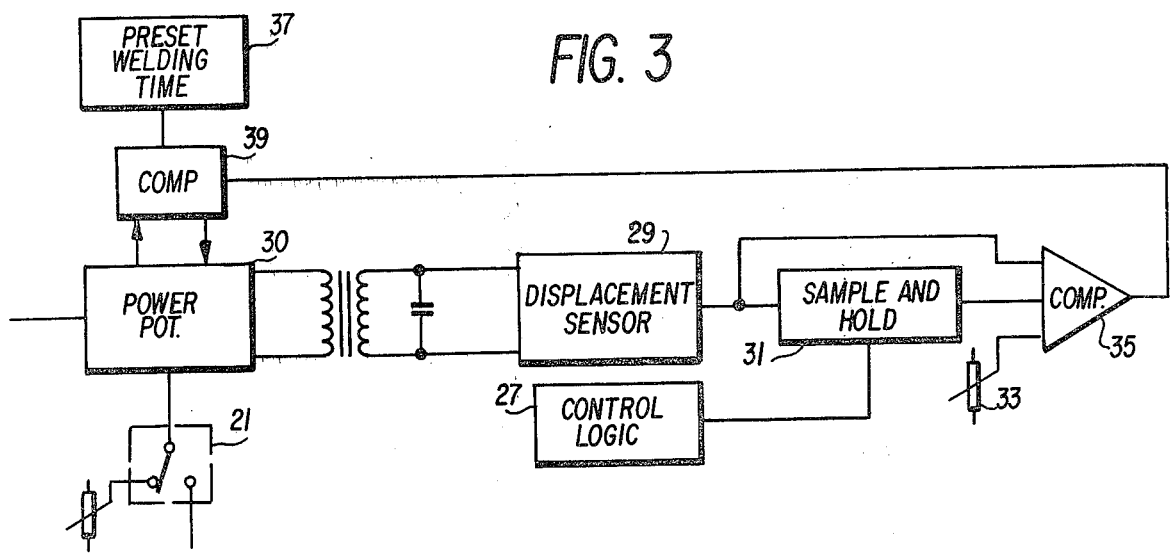
FIGS. 2, 3 and 4 are schematic diagrams of a three stage adaptive control unit which may be used in the present invention.
Figure 4:
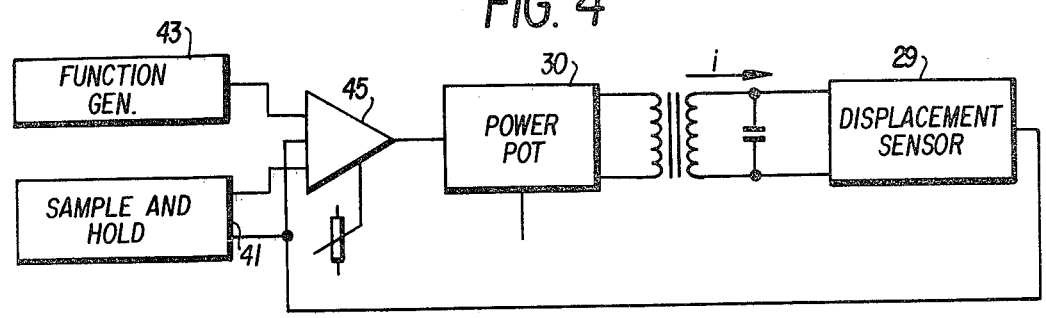
Figure 2:
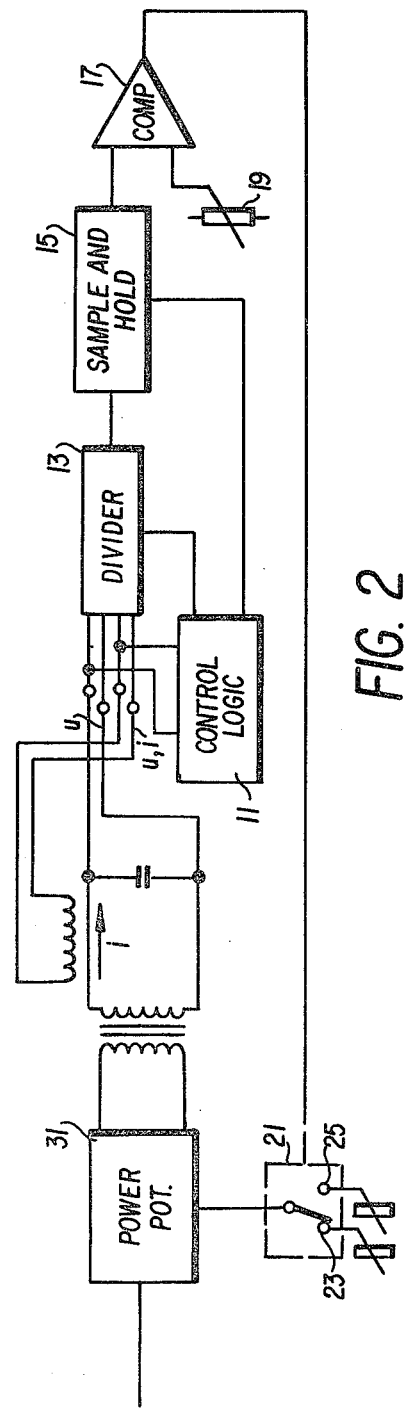

FIGS. 2, 3 and 4 illustrate a system which may be used to provide the three stage adaptive control unit discussed above.

FIG. 2 is a schematic diagram which relates to stage I. Using the values of the welding voltage u and the welding current i, the controlling logic-unit 11 generates signals for switching the divider 13 and sample and hold 15. The new value for the resistance R, calculated by the divider 13 for each half-cycle (in the case of single-, two- or three-phase AC-welding machines) is registered in sample and hold 15 and compared by the comparator 17 with the target value for Rmin or alternatively for the rate of decrease of the resistance dR/dt 19.

If the actual value of the resistance is lower or its rate of decrease is slower than the target value, then the switch 21 switches the current over from preheating 23 to welding 25.

FIG. 3 is a schematic diagram which relates to stage II. At the start of the welding current, the controlling logic 27 generates an impulse and the actual position of the welding head as measured by the displacement sensor 29 is registered in sample and hold 31. The empirically determined value for the maximum electrode displacement is set with the potentiometer 33. The actual value of electrode displacement as given by the sensor 29 is compared by the comparator 35 with the target value set with potentiometer 33 and stored in sample and hold 31. If this value is equalled or exceeded, the power setter 30 is switched off through the comparator 35 and the welding process is ended. If the given welding time as set by timer 37 is exceeded n times (n=2 .. . 20, n can be preselected) during consecutive weldings, the welding current i is increased.

FIG. 4 is a schematic diagram which relates to stage III. At the start of the welding current, the O-setting for the displacement sensor 29 is registered in sample and hold 41 and serves as the reference value for the transient course of the electrode displacement for the current welding process. At the same time the generator 43 for the selected displacement function is started. The s=f(t) curve may be set pointwise using potentiometers or generated, e.g. by a frequency generator. The controlling amplifier 45 with selectable PID (Proportional-Integral-Differential) behaviour generates a signal for the power settor 30 of the welding machine.

Figure 5:
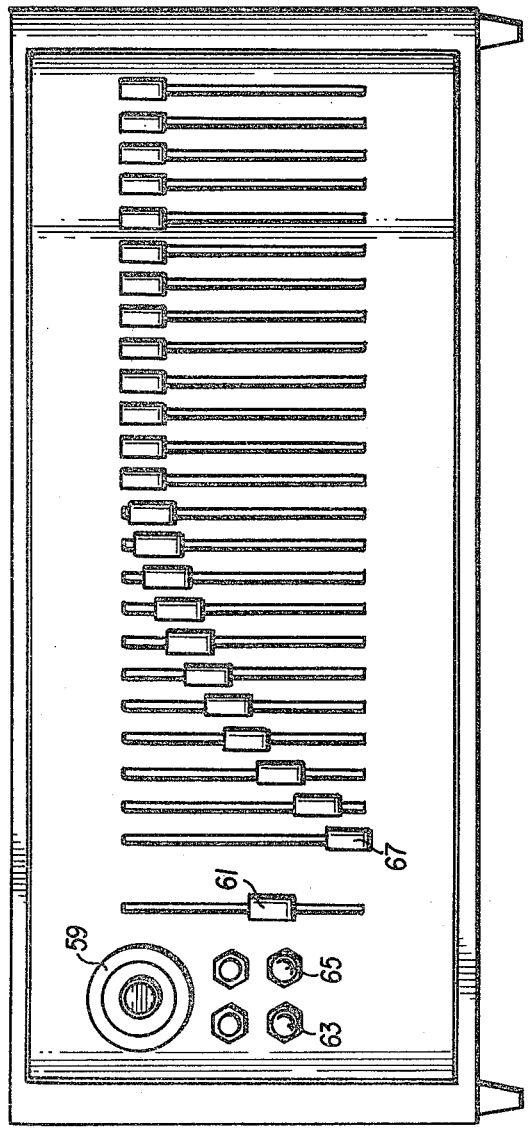
FIG. 5 is a front elevational view of a control panel used with the control unit of FIGS. 2, 3 and 4.

FIG. 5 relates to the panel of the control unit for the welding computer which, in the context of this disclosure, is one capable of carrying out calculations, generating signals, comparisons and the other operations performed by the three stages of the present control unit. Furthermore, the welding computer can store setting data regarding materials, sheet thicknesses, surface conditions, welding forces, electrode working face geometry, type of welding current (single phase-, three phase-AC or DC) etc. so that the welding process can be controlled in accordance with the specified method by indicating the material to be welded, its thickness and surface condition, etc. In addition, this computer can generate signals when the prescribed resistance values electrode displacement, or its function, are not attained, denoting that the process cannot be controlled optimally under the given circumstances. These may be optical or sonic.

In order to carry out the necessary computations etc. the computer may get its information from hard and/or software and function as an adaptive on-line process control unit. These objectives can be realized with suitable micro-processors with, if necessary access to a data bank. Additional information regarding setting data value for different types of machines can enlarge the range of optimum application.

The procedure for use is as follows:

(a) Set recommended electrode force, welding current and welding time. No spatter should occur with these settings. Stage II, set electrode displacement "s" on max. increase current until current flow time is reduced by one cycle. Increase "s" setting until set current-flow time is just achieved.

(b) Stage I:

"S" setting=0. Preheat $I_{Ph}$ setting c 0.5 welding current $I_w$.

Preheat time $t_{Ph}-1$ cycles. Reduce Rmin setting until $t_{Ph}$ is just reached. Note Rmin setting.

(c) Stage III: (FIG. 5) Knob 59 is provided for setting the background current. Potentiometer 61 provides the controller action (PIC). Knob 63 adjusts the frequency for set-point controlled, variable comparison. Knob 65 adjusts the range of expansion.

Starting welding current $I_8=0.7-0.8$ $I_w$. Select displacement range, e.g. "s", as determined in (a)=85 μm, Range=100 μm. "s" as determined in (a)=140 μm Range=250 μm.

Select time base, e.g., welding time=30 cycles, Pot.=40 ms. In the illustration, 15 potentiometers 67 are required (50 HZ Ac).

Alternately, the settings may be:

Welding-time=6 cycles, Pot=10 ms/20 ms/40 ms i.e. 12 Potentiometers @ 10 ms; or 6 Potentiometers @ 20 ms or 3 Potentiometers @ 40 ms.

Setting of displacement function: S=f(ts)

0.5 Smax at 0.25 ts

Smax at 0.75 ts

Potentiometers 67 are set such that a smooth "curve" of displacement is achieved as shown. This is important since a stable process is optimum. Selection of Control-Unit-Behaviour (PID) depends on the voltage range of the welding controls in which phase shift min-max occurs; for a small voltage range I, a medium range P, large range D.

EXAMPLE 1

1. Material: steel RST 1203, 1 mm thick, sheet surface clean, Electrode force=4, OKN, Electrode material: CuCrZr.

Radius of working face=75 mm $I_w = 11.0$ kA, $I_{vw} = 5.0$ kA, $R_{min} = 150$ μc, $t_w = 6$ cyc., $t_{Ph}set = 6$ Per $S_{max.} = 120$ μm $IB = 1.8$ kA Alternative: $R_{min} = 150$ μΩ dh/dt = 30 μΩ/half cycle 2. Material: Steel St1303, 2 mm thick, surface clean, Electrode force: 6.0 kN, Electrode material: CuCrZr Radius of working face: 150 mm $I_w = 16$ kA, $I_{vw} = 8.0$ kA, $R_{min} = 200$ μΩ, $t_w = 8$ cyc, $t_{Phset} = 6$ Per, $S_{max} = 220$ μm $IB = 11$ kA Alternative: $R_{min} = 220$ μΩ dh/dt = 35 μΩ/half cycle.

The invention may be embodied in other specific forms without departing from the spirit or essential characteristics thereof. The embodiment is therefore to be considered in all respects as illustrative and not restrictive.

What is claimed is:

1. A method of improving the reproducibility of the welds produced by an electric spot welding machine, which comprises
    (a) passing a preheating current of lower magnitude than a subsequent welding current through the workpieces to be welded;
    (b) monitoring the resistance of the weld starting with the first cycle of preheating current;
    (c) determining when the rate of decrease of the total weld resistance has fallen below a predetermined limit; and
    (d) then switching over from said preheating current to said welding current.

2. A method according to claim 1 further comprising, after initiation of said welding current, measuring the electrode displacement as determined by the thermal expansion of the workpieces and the size of the generated weld nugget and switching off said welding current when a predetermined amount of electrode displacement has been achieved.

3. A method according to claim 1 wherein said preheating current passed through the workpieces to be welded is between 20 and 50% of said welding current.

4. A method according to claim 2 further comprising stepwise raising or lowering of the welding current for subsequent spot welds if the prescribed upper or lower limits of a standard welding time have once or repeatedly been reached or exceeded.

5. A method according to claim 4, wherein predetermined electrode displacement during the welding time is prescribed as a reference and the welding current raised or lowered by continuous comparison of the reference with the actual displacement.

6. A method according to claim 5, comprising indicating that an electrode change is required when the desired electrode displacement cannot be achieved by raising the welding current even after an extension of welding time to a prescribed maximum.

7. A method according to claim 6, wherein the prescribed reference value of electrode displacement is corrected by hand or automatically by the control system when fluctuations of the electrical mains voltage and/or of the electrode pressure occur in excess of a prescribed tolerance limit.

8. A method of improving the reproducibility of the welds produced by an electric spot welding machine, which comprises
    (a) passing a preheating electrical current of lower magnitude than a subsequent welding current through workpieces to be welded at an interface between said workpieces to be welded;
    (b) monitoring the resistance of the weld starting with the first cycle of the preheating current;
    (c) determining when the total resistance of the interface of said workpieces has fallen below a predetermined limit; and
    (d) then switching over from said preheating current to said welding current.

* * * * *